(12) United States Patent
Gonzalez et al.

(10) Patent No.: US 12,347,258 B2
(45) Date of Patent: Jul. 1, 2025

(54) AUTOMATIC ASSET MANAGEMENT SYSTEM

(71) Applicant: SIGNIFI SOLUTIONS INC., Mississauga (CA)

(72) Inventors: Jaime Arturo Gonzalez, Markham (CA); Emil Jose Rodriguez Osorio, Etobicoke (CA); Yong Suk Jin, Oakville (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 568 days.

(21) Appl. No.: 17/902,476

(22) Filed: Sep. 2, 2022

(65) Prior Publication Data
US 2023/0084907 A1     Mar. 16, 2023

Related U.S. Application Data

(60) Provisional application No. 63/242,692, filed on Sep. 10, 2021.

(51) Int. Cl.
*G07F 11/00* (2006.01)
*B65G 1/06* (2006.01)
(Continued)

(52) U.S. Cl.
CPC ............. *G07F 11/005* (2013.01); *B65G 1/06* (2013.01); *B65G 1/1371* (2013.01); *G07F 11/02* (2013.01);
(Continued)

(58) Field of Classification Search
CPC ........ G07F 11/005; G07F 11/02; G07F 11/48; G07F 11/62; G07F 11/04; G07F 11/42;
(Continued)

(56) References Cited

U.S. PATENT DOCUMENTS 3,325,049 A * 6/1967 Craven ................... G07F 11/32
221/6
4,352,603 A * 10/1982 Anders ................... B65G 51/30
406/149

(Continued)

OTHER PUBLICATIONS

U.S. Appl. No. 17/972,337, Automatic Asset Management System, filed Oct. 24, 2022.

*Primary Examiner* — Michael Collins
(74) *Attorney, Agent, or Firm* — Perry + Currier Inc.

(57) ABSTRACT

There is provided a device for automatic asset management as well as a method for dispensing items from said automatic asset management device. The device comprises an enclosure, a shelving unit within the enclosure configured to store at least one item, a delivery hatch on the enclosure configured to allow access to the enclosure, and a dispensing unit within the enclosure. The dispensing unit comprises a front gate comprising an open portion and a closed portion, wherein the front gate is configured to control access through the delivery hatch and an elevator module configured to receive the item from the shelving unit, move to the front gate to link with the front gate, while linked with the front gate, move with the front gate to align the open portion with the delivery hatch to allow access to the item within the elevator module; and upon removal of the item from the elevator module, release the front gate to align the closed portion with the delivery hatch to restrict access to the delivery hatch.

19 Claims, 14 Drawing Sheets

(51) Int. Cl.
  *B65G 1/137* (2006.01)
  *G07F 11/02* (2006.01)
  *G07F 11/48* (2006.01)
  *G07F 11/62* (2006.01)

(52) U.S. Cl.
  CPC ............. *G07F 11/48* (2013.01); *G07F 11/62* (2013.01); *B65G 2203/0283* (2013.01)

(58) Field of Classification Search
  CPC . B65G 1/06; B65G 1/1371; B65G 2203/0283
  See application file for complete search history.

(56) References Cited

U.S. PATENT DOCUMENTS

| | | | | |
|---|---|---|---|---|
| 6,230,930 | B1* | 5/2001 | Sorensen | G07F 11/42 |
| | | | | 221/289 |
| 6,755,322 | B1* | 6/2004 | Herzog | G07F 11/58 |
| | | | | 221/133 |
| 8,556,119 | B2* | 10/2013 | Skavnak | G07F 11/165 |
| | | | | 221/133 |
| 9,242,810 | B2* | 1/2016 | Lõssov | G06Q 10/08 |
| 9,330,519 | B2 | 5/2016 | Busto | |
| 9,640,014 | B2 | 5/2017 | Pritchard et al. | |
| 9,652,923 | B2 | 5/2017 | Doom | |
| 11,875,628 | B2* | 1/2024 | Gonzalez | B65G 1/1371 |
| 2008/0179343 | A1* | 7/2008 | Perkins | G07F 11/1653 |
| | | | | 221/208 |
| 2011/0226795 | A1* | 9/2011 | Sichich | G07F 11/165 |
| | | | | 221/133 |
| 2018/0244469 | A1* | 8/2018 | Testa | G07F 11/165 |
| 2019/0031441 | A1* | 1/2019 | Jin | G07F 11/58 |
| 2022/0204265 | A1* | 6/2022 | Brezinski | E05F 15/616 |

* cited by examiner

AUTOMATIC ASSET MANAGEMENT SYSTEM

FIELD

The specification relates generally to automatic asset management devices and methods for dispensing items, and more specifically to automatic asset management devices with enhanced accessibility features.

BACKGROUND

Automatic asset management devices are widely used for stocking items as well as vending those items to users and customers. Conventional asset management devices are often inaccessible to certain users with physical disabilities that are limited in their range of motion. Additionally, conventional asset management systems may not comply with regulations or standards such as the *Americans with Disabilities Act* of 1990 ("ADA"), focused on ensuring that individuals with disabilities have access to the same opportunities as able-bodies individuals, section 508 of the *Rehabilitation Act, which* mandates that federal agencies develop, acquire, maintain, and use information and communications technology that people with disabilities can access, and the *Web Content Accessibility Guidelines* ("WCAG"), which describes a series of standards developed with the main focus of making websites accessible to users with disabilities.

There is a need for an automatic asset management device that is offers a wide variety of items that may be dispensed, while maintaining convenient accessibility as well as complying with requirements in the ADA, WCAG, and the *Rehabilitation Act*.

SUMMARY

Described herein and in accompanying documents is an asset management device including elevator modules, shelving units, and dispensing units that provide the accessible dispensing of items to users with various accessibility needs.

According to an aspect of the present specification an example apparatus includes an automatic asset management device comprising an enclosure, shelving unit and dispensing unit; wherein the shelving unit includes shelving racks and driving elements; wherein the dispensing unit includes an elevator module associated with a front gate and a rear gate; wherein the elevator module, which moves vertically to delivery items, includes pin switches to attach or detach to the front gate and the rear gate; wherein the elevator module is aligned with a delivery hatch giving customers convenient accesses to items, maintaining the front gate opened and the rear gate closed.

According to another aspect of the present specification, an example method includes a method for dispensing an item from an automatic asset management device, the method comprising: receiving a dispensing request indicating an item to be dispensed; sending a command to a motor controller; moving forward the item to drop into an elevator module; moving the elevator module between a front gate and a rear gate; attaching pin switches to the front gate and the rear gate lifting a dispensing unit to open the front gate; dispensing the item to a customer; releasing connection pins from the front gate and the rear gate; locking the front gate; homing the elevator module; storing information of the item in a database.

In accordance with an aspect of the invention, there is provided a device comprising an enclosure, a shelving unit within the enclosure configured to store at least one item, a delivery hatch on the enclosure configured to allow access to the enclosure, and a dispensing unit within the enclosure. The dispensing unit comprises a front gate comprising an open portion and a closed portion, wherein the front gate is configured to control access through the delivery hatch and an elevator module configured to receive the item from the shelving unit, move to the front gate to link with the front gate, while linked with the front gate, move with the front gate to align the open portion with the delivery hatch to allow access to the item within the elevator module; and upon removal of the item from the elevator module, release the front gate to align the closed portion with the delivery hatch to restrict access to the delivery hatch. The automatic asset management device can further comprise at least one bracket on the front gate and at least one connection pin on the elevator module, wherein the connection pin is configured to link to the bracket to allow the elevator module and front gate to link together. The shelving unit can further comprise at least one shelving rack and driving elements configured to move the item from the shelving rack into the elevator module. The dispensing unit can further comprise a rear gate configured to restrict access to the shelving unit through the dispensing unit.

The automatic asset management device can further comprise a connection pin on a rear side of the elevator module and a bracket on the rear gate, wherein the connection pin is configured to link to the bracket to allow the elevator module and rear gate to link together. The elevator module may further comprise a linear actuator configured to link the elevator module to the front gate and to control the movement of the elevator module together with the front gate. The elevator module may further comprise a sensor suite configured to detect the location of the elevator module within the enclosure, allowing the elevator module to link automatically with the front gate once it has been reached, detect once a product has been moved into the elevator module, allowing the elevator module to move the front gate to an open position; and detect once a product has been taken out of the elevator module through the delivery hatch, allowing the elevator module to return to a resting position. The elevator module can further comprise an elevator controller configured to control the movement of the elevator module to the front gate. The elevator module can be further configured to unlink from the front gate, allowing the closed portion of the front gate to align with the delivery hatch to restrict access to the delivery hatch. The bottom surface of the elevator module can be configured to align with a bottom surface of the delivery hatch when the open portion of the front gate is aligned with the delivery hatch. The automatic asset management device may further comprise a user interface to enable users to make selections and payments.

In accordance with an aspect of the invention, there is provided a method for dispensing an item from an automatic asset management device, the method comprising moving an item, from a shelving unit into to an elevator module, controlling, through an elevator controller, the movement of the elevator module within the asset management device to the front gate, upon the elevator module reaching a front gate, linking the elevator module with the front gate, moving the elevator module together with the front gate to align an open portion on the front gate with a delivery hatch, allowing access to the item in the elevator module; and, upon removal of the item from the delivery hatch, aligning a closed portion on the front gate with the delivery hatch, preventing further access to the elevator module. The method for dispensing an item may further comprise inking the elevator module with a rear gate and moving the elevator module together with the front gate and the rear gate, the rear gate restricting access to the shelving unit.

BRIEF DESCRIPTION OF DRAWINGS

Implementations are described with reference to the following figures, in which.

DETAILED DESCRIPTION

The exemplary embodiments described herein provide an automatic asset management system or device. The automatic asset management device uses a shelving unit and a dispensing unit including an elevator module, gates and control devices to dispense items or assets stored in the automatic asset management device to a user. The automatic asset management device may use an elevator module to receive items from the shelves to reduce wear to the item or asset during the dispensing operation. Additionally, the elevator module may align with the delivery hatch such that a floor of the elevator module (i.e., the surface on which items to be dispensed rest when in the elevator module) aligns with a bottom edge of the delivery hatch. Thus, items in the elevator module may be larger while still allowing for easy removal by a user. Additionally, such alignment is more accessible, for example, for compliance with ADA requirements and such. The elevator module and dispensing unit may allow various configurations of the shelving unit depending on the types of items being dispensed to be serviced. Furthermore, the dispensing unit may have gates to link to the elevator module to ensure security of the assets stored in the automatic asset management device when an item is dispensed.

Figure 1:
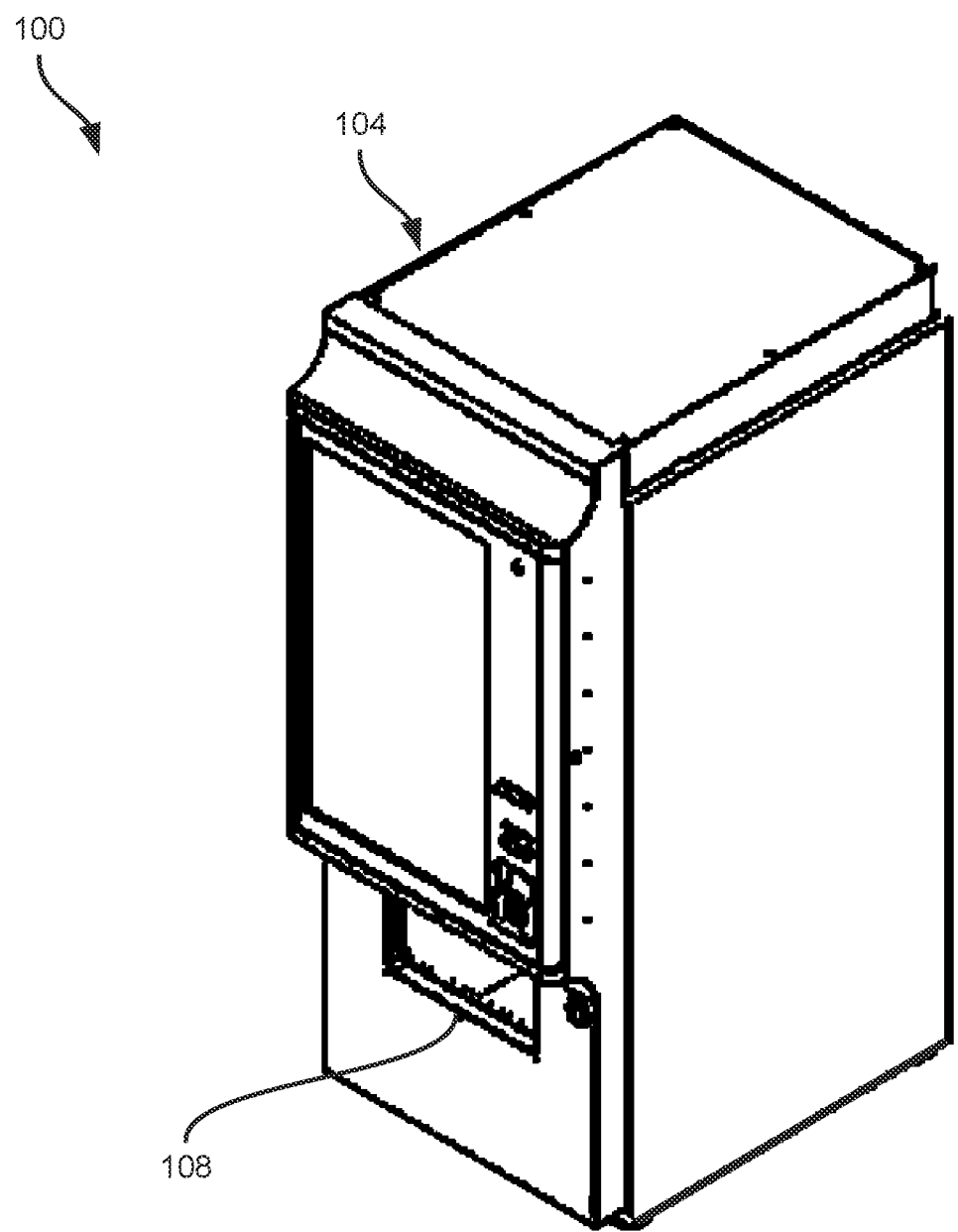
FIG. 1 shows a perspective view of an embodiment of an asset management device.

FIG. 1 shows a perspective view of an example asset management device 100 (also referred to herein as simply the device 100). The device 100 is generally configured to house assets or items which may be dispensed to users. For example, the device 100 may be a type of vending machine, in which the items stored therein are dispensed to users upon sale to the user. In other examples, the device 100 may be to dispense equipment or the like, for example, in a hospital, warehouse, office building, or other facility. The device 100 includes an enclosure 104 in which the items are housed and a delivery hatch 108 on the enclosure to allow access to the enclosure 104. That is, items may be dispensed from the enclosure 104 via the delivery hatch 108.

The enclosure 104 defines an interior of the asset management device 100, in which the components of the device 100 are disposed. The enclosure 104 also stores the items to be dispensed from the device 100. The enclosure 104 may include a front plate, one or more side plates, a top plate and a bottom plate. That is, the enclosure 104 may be substantially a rectangular prism in shape. In other examples, the enclosure 104 may be defined by other plates, structural elements and/or be substantially different shapes. The front plate may be a door that allows access to the interior of enclosure 104 for the purpose of maintaining asset management device 100 (e.g., replenishing the items or assets stored therein by an operator of the asset management device 100). The front plate and/or door may additionally include various user interface devices, to receive input from users. Enclosure 104 may be made of steel, or any other material that will be evident to those skilled in the art. The front plate of enclosure 104 may also comprise a display. The display can be a glass display showing all items within enclosure 104, and/or it can be a graphical display.

The delivery hatch 108 is a cut-out portion or aperture on enclosure 104 and is configured to allow access to the interior of enclosure 104. The delivery hatch 108 allows items to be dispensed from the device 100, for example, by allowing a user to reach through the delivery hatch 108 to retrieve an item which is on the interior side of the delivery hatch 108. Delivery hatch 108 may be placed at a height on the enclosure that allows for ergonomic accessibility of the items, when compared to conventional dispensing structures, where delivery hatches are often places at a lower location on the enclosure. Placing delivery hatch 108 at a specific height further allows users to access the delivery hatch when sitting, for example, in a wheelchair. Delivery hatch 108 may be placed in accordance with the heights prescribed for accessibility based on ADA compliance requirements.

Figure 2:
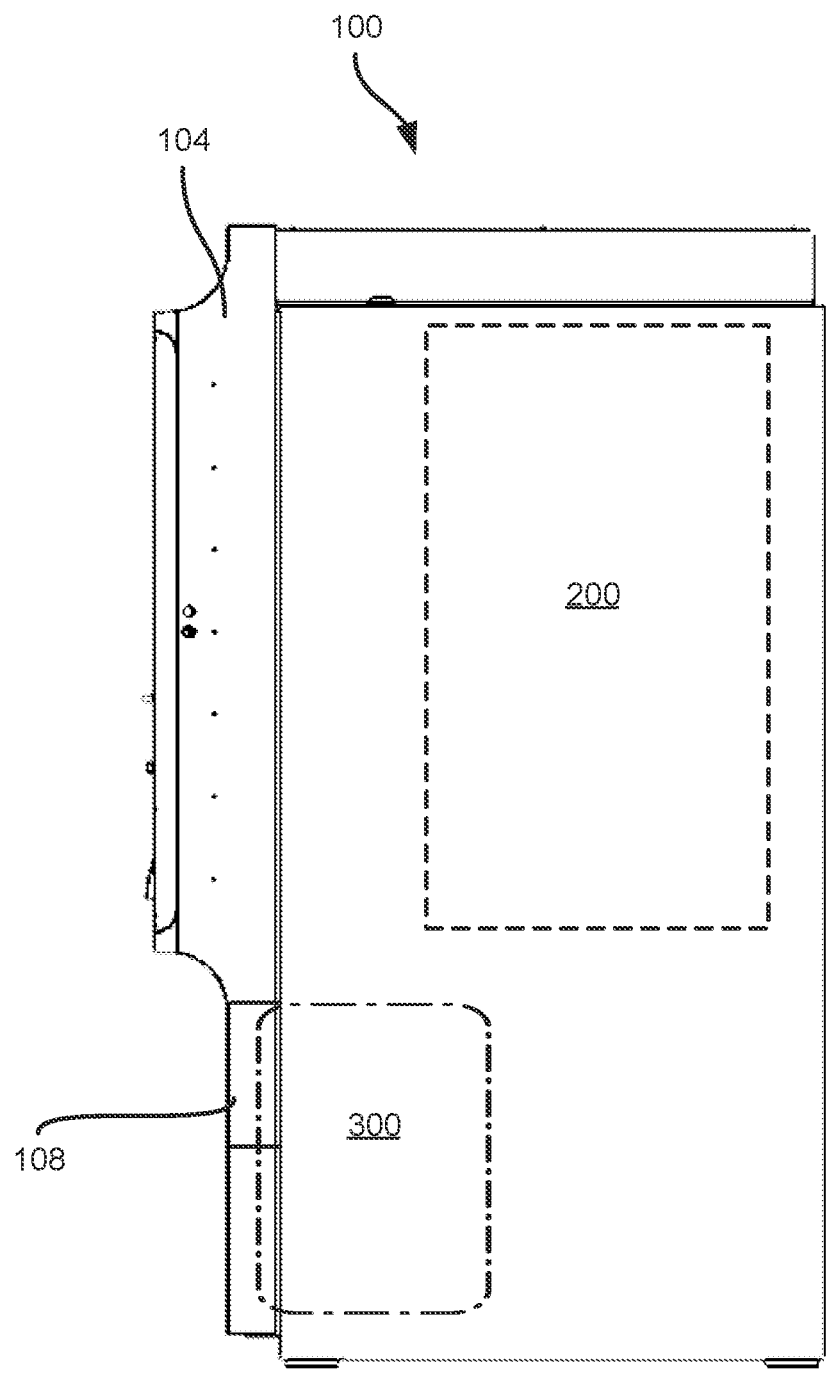
FIG. 2 shows a side view of an embodiment of an asset management device.

Referring now to FIG. 2, a side view of asset management device 100 is provided.

Asset management device 100 may further include a shelving unit 200. Shelving unit 200 is housed in the enclosure 104 and is configured to store the items that are to be dispensed. The shelving unit 200 may have a variety of configurations, which may vary based on the items to be dispensed. For example, the shelving unit 200 may include a plurality of vertically spaced shelves, a plurality of horizontally spaced slots, or other suitable configurations.

Asset management device 100 also includes a dispensing unit 300 configured to enable the items stored on the shelving unit 200 to be dispensed to the delivery hatch. That is, the dispensing unit 300 may receive an item from the shelving unit 200 and transport the item to the delivery hatch to allow a user to retrieve the item from the dispensing unit 300 via the delivery hatch. In particular, to transport the items from the shelving unit 200 to the delivery hatch 108, the dispensing unit 300 include one or more movable modules which may be controlled to move to an appropriate location adjacent to the shelving unit 200 (e.g., moved up and down in front of the appropriate shelf, or left and right, in front of the appropriate slot, or similar) to receive the item and to the delivery hatch 108 to subsequently dispense the item.

Figure 3:
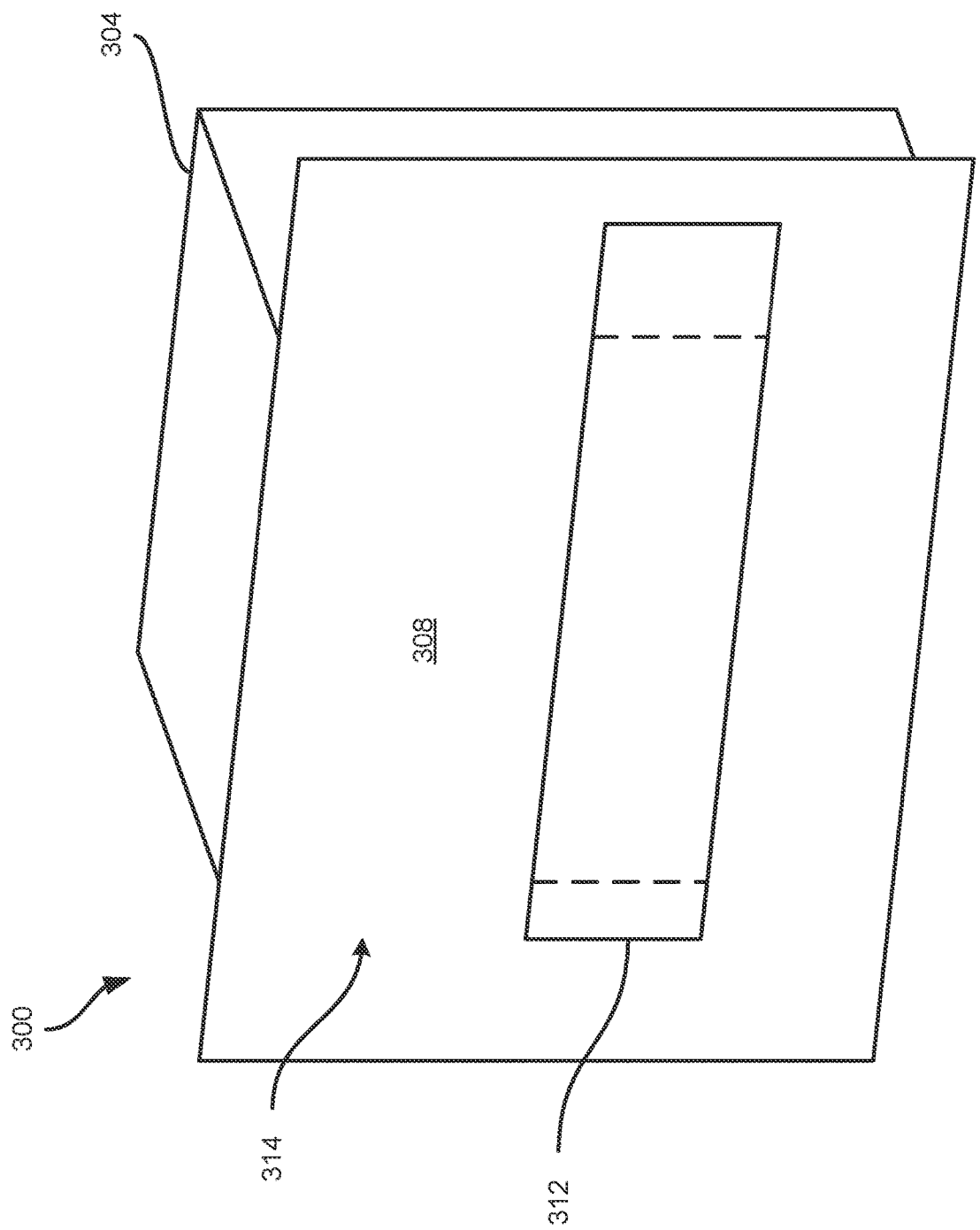
FIG. 3 shows a perspective view of an embodiment of a dispensing unit.

For example, referring to FIG. 3, a schematic diagram of the dispensing unit 300 is depicted. The dispensing unit 300 includes an elevator module 304 and a front gate 308.

The elevator module 304 is a movable module and may be controlled to move, in the present example, vertically within the enclosure 104 to receive items from the shelving unit 200. In some examples, the elevator module 304 may also be controlled to move horizontally across (e.g., left-to-right, as viewed from the front of the device 100), or into and out of (e.g., left-to-right, as viewed from the side of the device 100) the shelving unit 200. The elevator module 304 may then move to the delivery hatch 108 to facilitate dispensing of the item to the user via the delivery hatch 108.

The front gate 308 is generally configured to control access through the delivery hatch 108 by blocking or unblocking the delivery hatch 108. In particular, the front gate 308 may include an open portion 312 and a closed portion 314. The front gate 308 is movable relative to the delivery hatch 108 so that either the closed portion 314 or the open portion 312 are aligned with the delivery hatch 108. When the closed portion 314 is aligned with the delivery hatch 108, the closed portion 314 blocks the delivery hatch 108, and hence the front gate 308 restricts access through the delivery hatch 108. When the open portion 312 is aligned with the delivery hatch 108, the aperture defining the open portion 312 may align with the aperture defining the delivery hatch 108, and hence the delivery hatch 108 is unblocked. Thus, the front gate 308 controls access to the interior of the enclosure 104 through delivery hatch 108, by either allowing access when open portion 312 is aligned with delivery hatch 108 or restricting access when closed portion 314 is aligned with delivery hatch 108.

In some examples, the front gate 308 may be configured to link to the elevator module 304 such that movement of the elevator module 304 facilitates the alignment of either the open portion 312 or the closed portion 314 with the delivery hatch. For example, the front gate 308 may be configured to link to the elevator module 304 such that alignment of the open portion 312 of the front gate 308 with the delivery hatch 108 may only be achieved via the elevator module 304. Advantageously, in such examples, when the delivery hatch 108 is unblocked and access is allowed through the delivery hatch 108, the accessible portion of the interior of the enclosure 104 corresponds to the interior of the elevator module 304. To allow access to the elevator module 304, elevator module 304, while linked to the front gate 308, may move to align open portion 312 with delivery hatch 108. To restrict access, the elevator module 304, while linked to the front gate 308, may move to align the open portion 312 to block the delivery hatch 108. In other examples, to restrict access, the front gate 308 may unlink from the elevator module 304 to block delivery hatch 108 with closed portion 314. In such examples, the front gate 308 may preferably be biased to align the closed portion 314 with the delivery hatch, for example, by gravity, via a spring or other biasing mechanism, or the like. Further, in other examples, the front gate 308 may move independently of the elevator module 304.

The dispensing unit 300 may also include a controller (not shown) such as a central processing unit (CPU), microcontroller, microprocessor, processing core, or similar device capable of executing instructions. The controller may also include or be interconnected with a non-transitory machine-readable storage medium that may be electronic, magnetic, optical, or other physical storage device that stores executable instructions allowing the controller to control movement of the elevator module 304 as described herein. The controller of the dispensing unit 300 may cooperate with one or more controllers for other components of the device 100, for example, which may track or control components of the shelving unit, item inventory, vending and/or dispensing capabilities, and the like.

Figure 4:
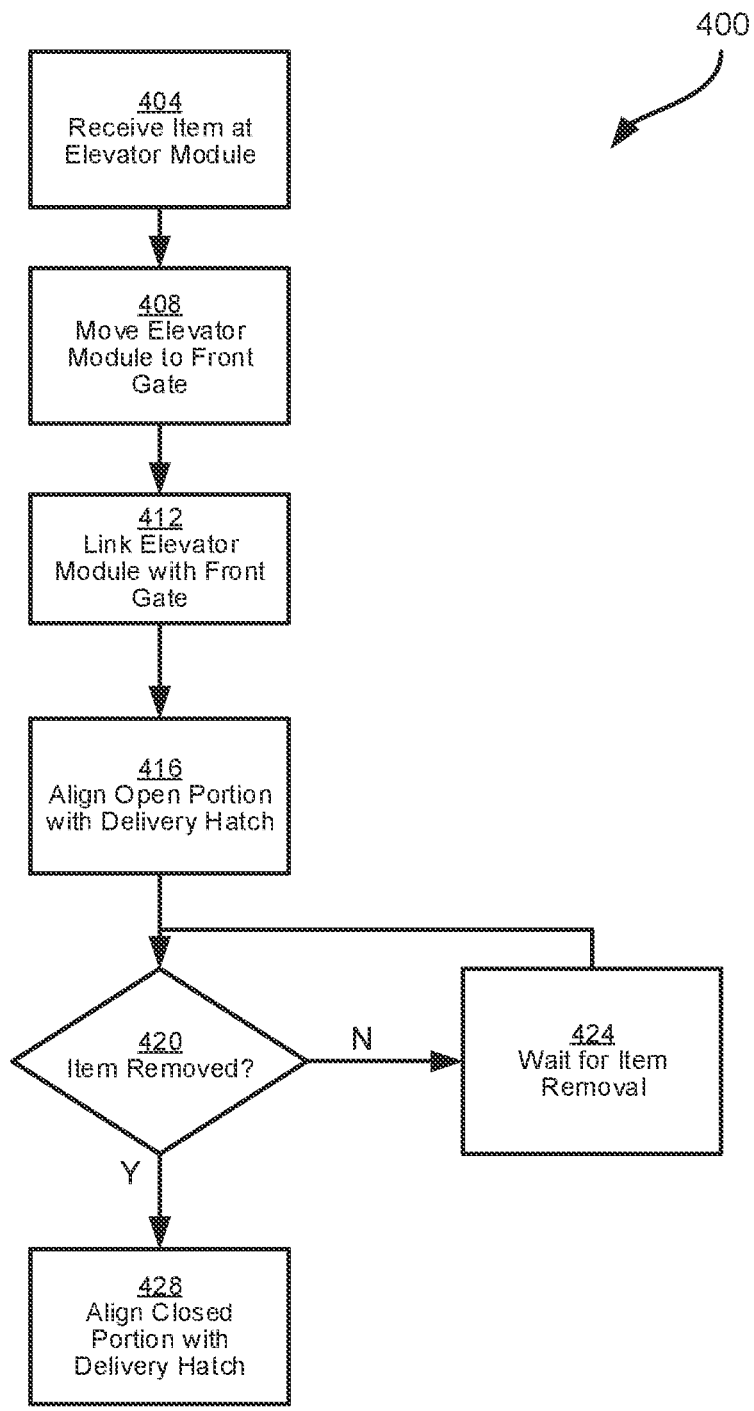
FIG. 4 shows a method for dispensing an item from an asset management device.

Referring now to FIG. 4, a method 400 for the operation of asset management device 100 when dispensing an item is shown. For illustrative convenience, method 400 will be discussed in relation to asset management device 100 and the components illustrated in FIGS. 1-3. In other examples, the method 400 may be performed by other suitable devices and/or systems.

The method 400 is initiated at block 404, for example in response to a request from a user. The request may be received, for example, via input at a display (e.g., including a display screen, a touchscreen, various input buttons and/or keys, a keypad, and the like). The request may specify a particular item to be dispensed. In response to the request, at block 404, the elevator module 304 receives the item. In some examples, the elevator module 304 may actively retrieve the item (e.g., if the elevator module 304 includes various arms or other mechanisms to retrieve items), while in other examples, the elevator module 304 may be passive and the item may be moved into the elevator module 304 via external means. In some examples, a combination of the above is contemplated. For example, the elevator module 304 may move proximate a location of the item on the shelving unit 200 and may receive the item via actuation of a component of the shelving unit 200.

Figure 5:
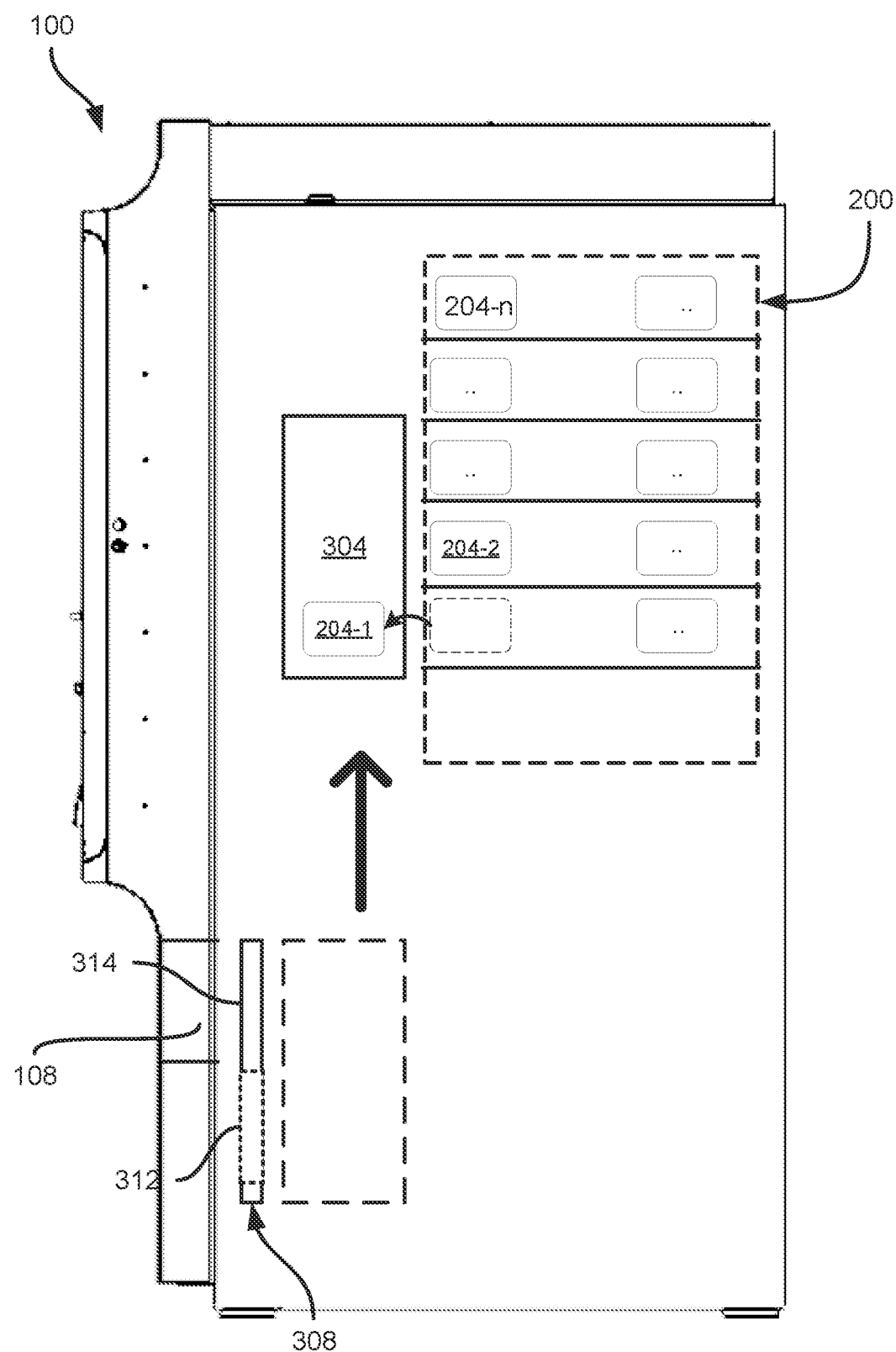
FIG. 5 shows an illustration of an elevator module receiving an item from a shelving unit.

For example, FIG. 5 illustrates a schematic diagram of a performance of block 404 of the method 400. For example, the shelving unit 200 may support a plurality of items 204-1, 204-2, . . . , 204-$n$ (referred to collectively as items 204 and generically as an item 204; this nomenclature is used elsewhere herein). Upon receipt of a request from a user to dispense the item 204-1, elevator module 304 may move to shelving unit 200. Upon reaching shelving unit 200, elevator module 304 aligns itself at the location of the item 204-1. For example, the controller of the dispensing unit 300 may cooperate with an inventory management controller to identify the location of the item 204-1 within the shelving unit 200. The elevator module 304 may then receive the item 204-1 from the shelving unit 200. Accordingly, in some examples, a rear side of the elevator module 304 (i.e., a side of the elevator module 304 closest to the shelving unit 200) may be substantially open to allow receipt of the items 204 into the elevator module 304.

Figure 6:
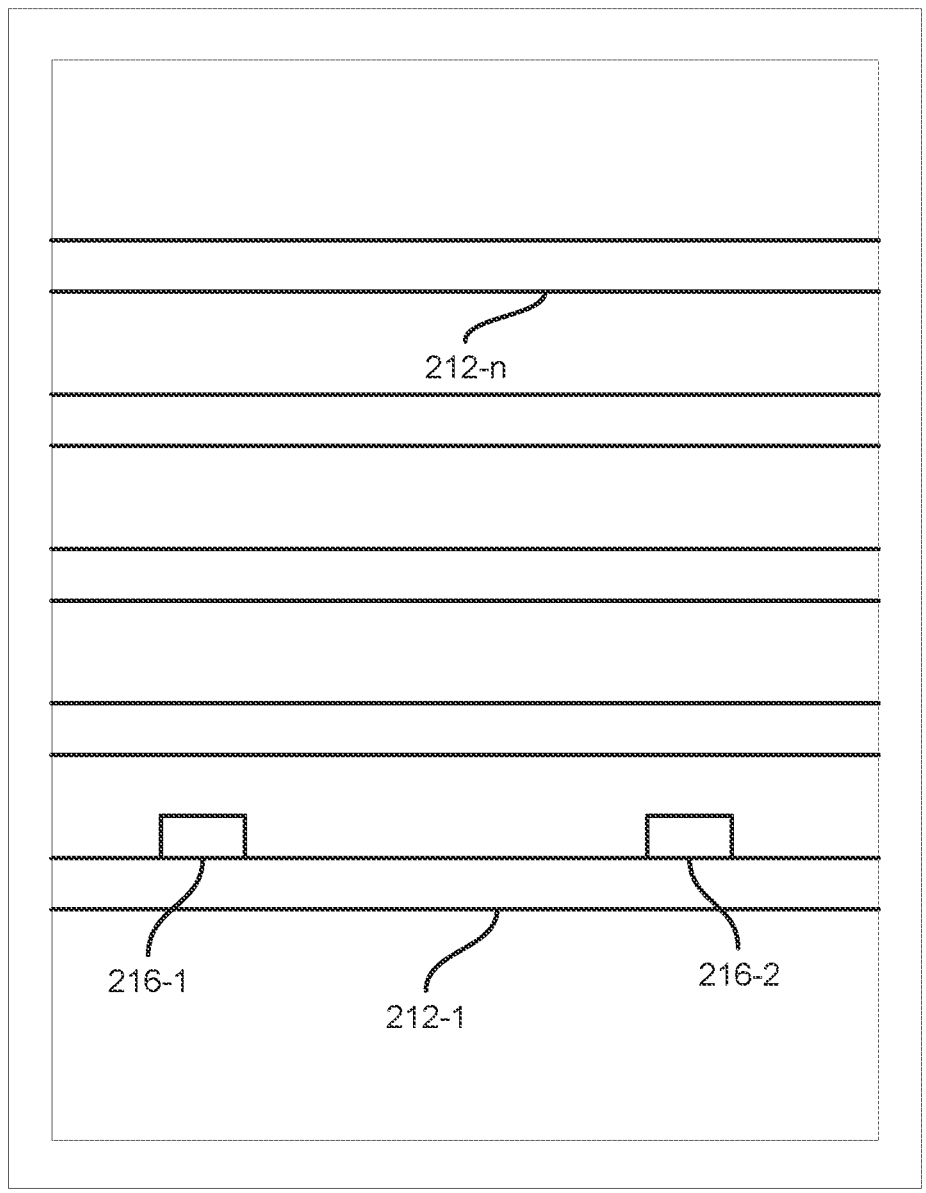
FIG. 6 shows a front view of a shelving unit.
Figure 7:
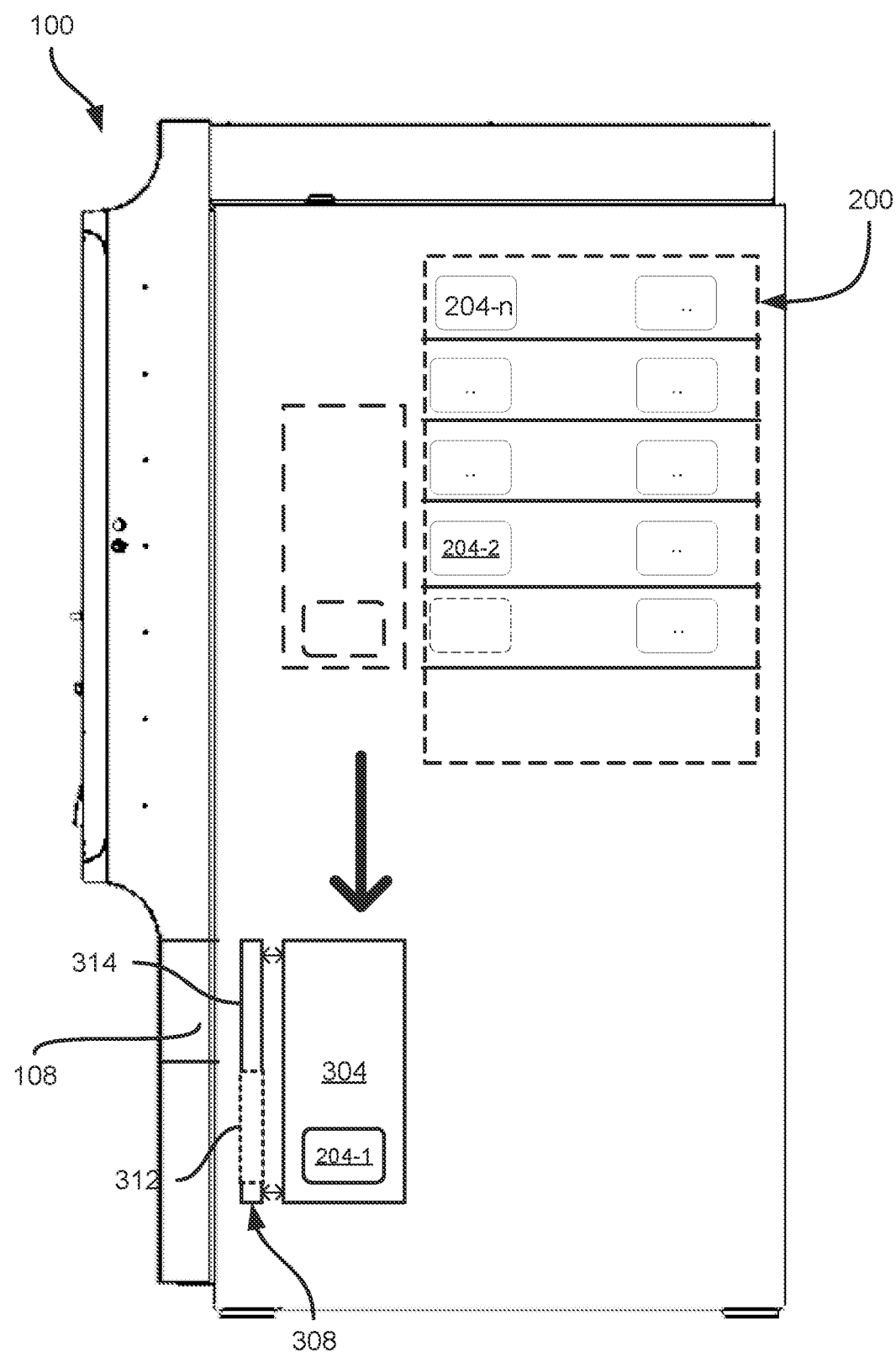
FIG. 7 shows an illustration of an elevator module linking with a front gate.

For example, referring to FIG. 6, a schematic diagram of the shelving unit 200 is depicted. The shelving unit 200 may include shelving racks 212-1, 212-2, . . . , 212-$n$ that are able to hold items of various sizes. Shelving unit 200 may further include of driving elements 216-1 and 216-2 depicted on shelving rack 212-1. Each shelving rack 212 may have its own set of driving elements 216 (not depicted) or driving elements 216 can be configured to move between each shelving rack 212. The driving elements 216 work to move an item 204 off the respective shelving rack 212 (e.g., in a direction towards the elevator module 304, which in the present example, corresponds to a direction towards a front face of the device 100).

Accordingly, returning to FIG. 5, when the elevator module 304 is aligned with the requested item 204-1, the driving elements 216 may be actuated to move the requested item 204-1 into the elevator module 304. Preferably, alignment of the elevator module 304 with the requested item 204-1 may be defined such that the floor of the elevator module 304 is aligned with the shelving rack 212 on which the 204-1 is located, so that the item 204-1 does not move vertically when being transferred from the shelving rack 212 to the elevator module 304.

The elevator module 304 may be equipped with one or more location detection sensors (not shown) that detect its location within asset management device 100. The location detection sensors may enable elevator module 304 to travel through asset management device 100, for example, to be aligned with specific shelving racks 212. For example, the location detection sensors may be located exterior to the elevator module 304 to detect the relative locations of various components of the asset management device 100 to enable the location of the elevator module 304 to be determined. The location detection sensors may include image sensors, depth sensors, cameras, and the like.

Furthermore, while the elevator module 304 of the dispensing unit 300 is moving to receive an item 204, the front gate 308 may be maintained with the closed portion 314 aligned with the delivery hatch 108 (i.e., in a closed position) to restrict access through the delivery hatch 108 into the enclosure 104. As will be appreciated, this may restrict users from reaching through the delivery hatch to retrieve items from the shelving unit 200 while a dispensing operation is underway.

Returning to FIG. 4, at block 408, the elevator module 304, while carrying the item 204-1, moves to be aligned with the front gate 308. Elevator module 304 may use the location detection sensors to detect alignment with the front gate 308. In particular, the elevator module 304 be aligned to allow the elevator module 304 to link to the front gate 308. For examples, the elevator module 304 and the front gate 308 may include respective connectors. Accordingly, in some examples, the location detection sensors may track alignment of the respective connectors. In other examples, the respective locations of the connectors may be fixed when the front gate 308 is in the closed position and not linked to the elevator module 304, and hence the location detection sensors may track the location of the elevator module 304 as a whole relative to the interior of the enclosure 104, rather than the particular alignment of the connectors.

At block 412, upon reaching front gate 308, the elevator module 304 links with front gate 308. That is, the respective connectors of the elevator module 304 and the front gate 308 may physically associate with one another to allow the elevator module 304 and the front gate 308 to move together as a single unit. In some examples, the connector of the elevator module 304 may be controlled and/or actuated to link to a static connector of the front gate 308, while in other examples, the connector of the front gate 308 may be actuated and/or controlled to link to a static connector of the elevator module.

Figure 8:
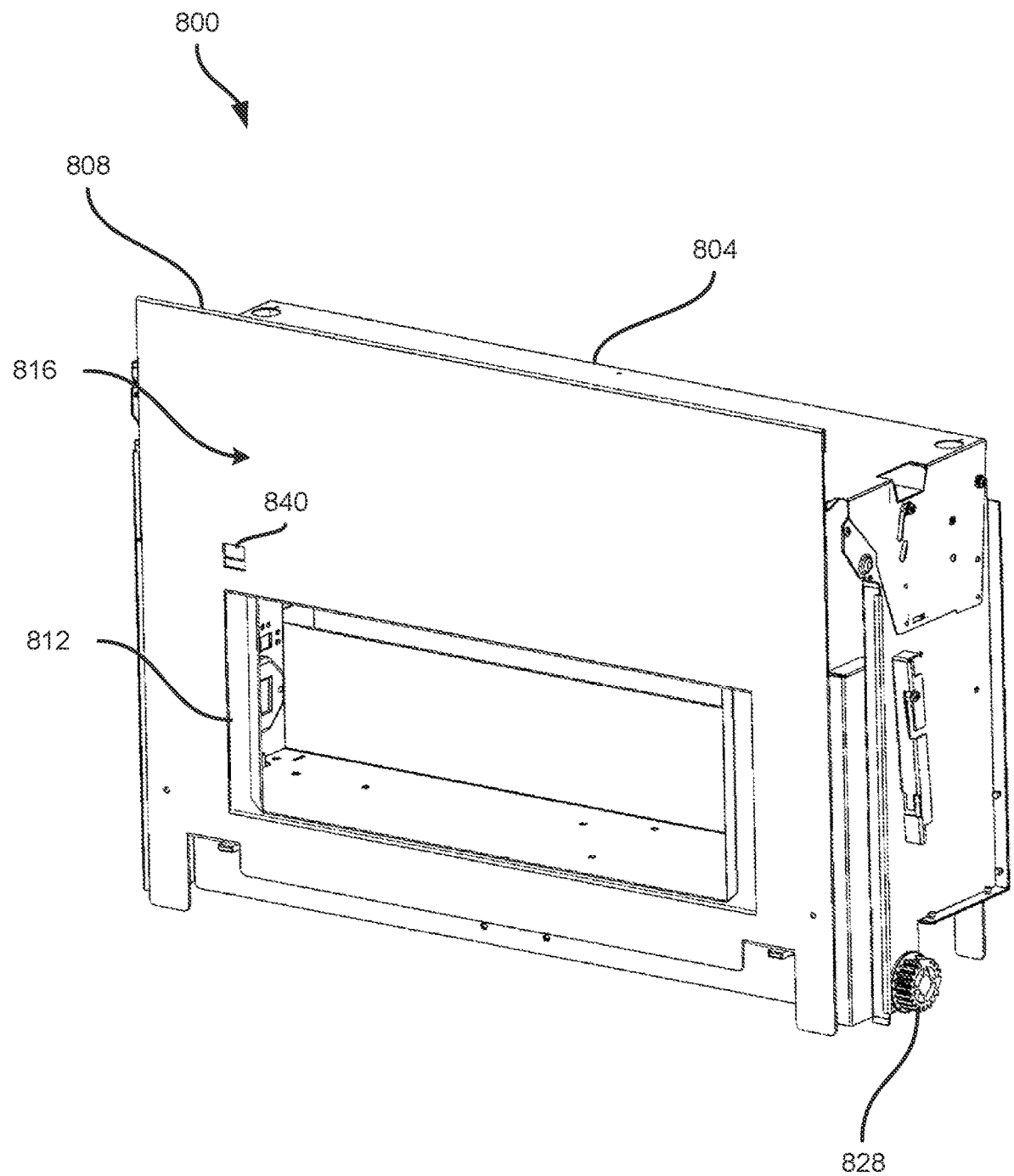
FIG. 8 and FIG. 9 show an alternative embodiment of a dispensing unit.

An exemplary embodiment of the manner in which the front gate and the elevator module may link is shown in FIG. 8, in which a perspective view of an alternate embodiment of dispensing unit 800 is shown. Dispensing unit 800 comprises elevator module 804 and front gate 808, which has an open portion 812 and a closed portion 816. The dispensing unit 800, the elevator module 804, the front gate 808, the open portion 812 and the closed portion 816 are similar to the dispensing unit 300, the elevator module 304, the front gate 308, the open portion 312 and the closed portion 314, respectively.

Figure 9:
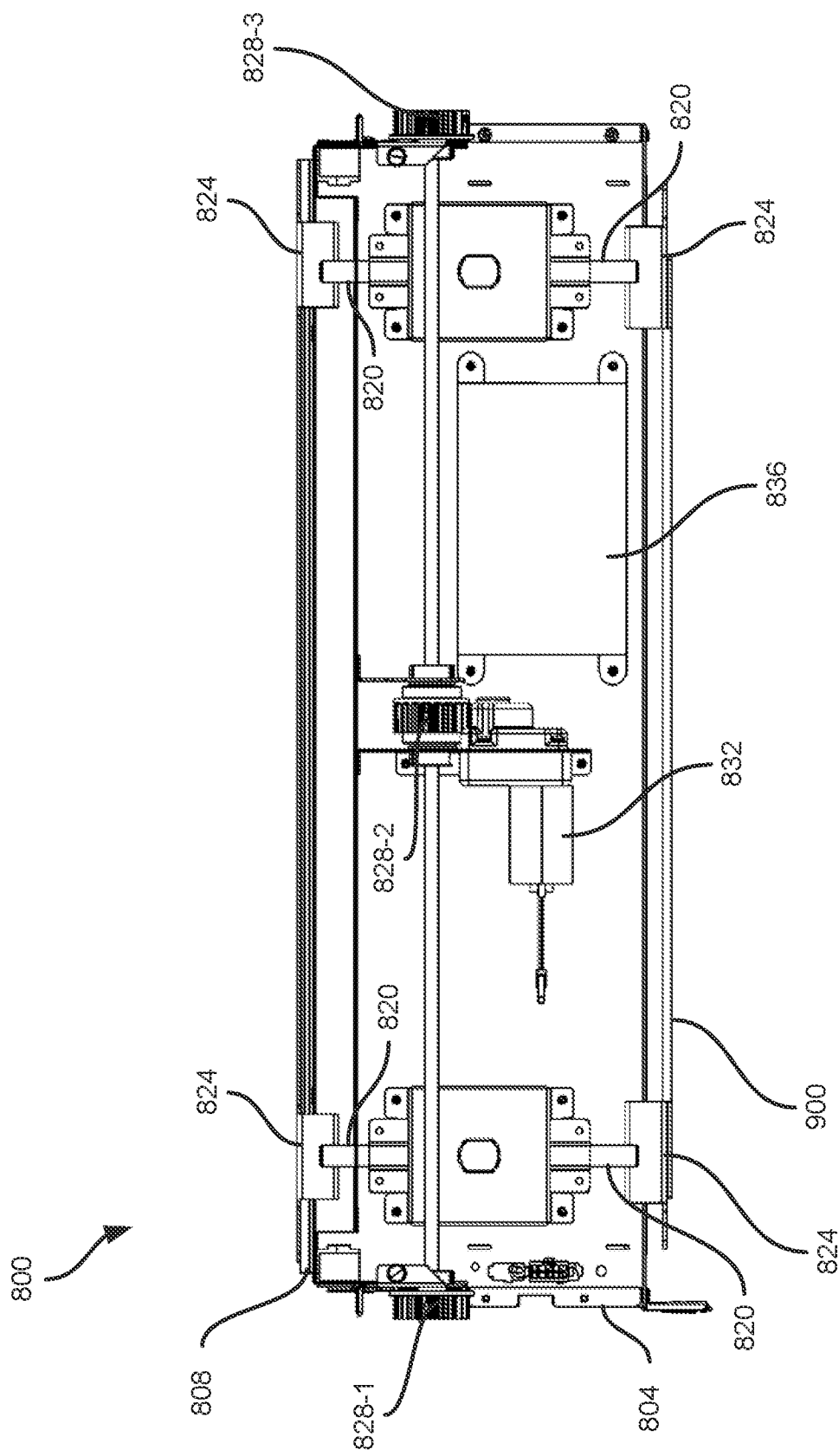

Referring to FIG. 9, a bottom view of the dispensing unit 800 is depicted. To enable the physical link between the elevator module 804 and the front gate 808 and a rear gate 900 (as will be described in further detail below), the elevator module 804 may include connection pins 820, which are configured to extend from the elevator module 804 (e.g., upon actuation) to mate with complementary brackets 824 on the front gate 808. Connection pins 820 may be operated by pin driving elements (not shown) such as solenoid switches, motors or linear actuators receiving commands from the elevator controller (not shown). Connection pins 820 may also be linear actuators, which enable the precise movement of connection pins 820 to brackets 824. The brackets 824 may include a space or indent configured to receive the connection pins 820. Thus, when the elevator module 804 moves, the connection pins 820 interface with the brackets 824 to cause the front gate 808 to move with the elevator module 804 as a single unit.

Additionally, as can be seen in FIG. 9, the elevator module 804 may further include elevator gears 828 which facilitate the vertical movement of elevator module 804. Elevator module 804 moves vertically using the elevator gears 828 associated with gear belts (not shown). The elevator module 804 may further include an elevator motor 832 which drives elevator module 804 (e.g., via actuation of the elevator gears 828) and may be controlled by elevator controller 836. Controller 836 may be configured to detect stalls which occurs when elevator motor 832 experiences overload. When controller 836 detects overcurrent from elevator motor 832 over a designated amount of time, controller 836 can be configured to disable elevator motor 832 from moving until the current is adjusted within the device to an appropriate amount.

Returning to FIG. 8, the front gate 808 may also include a latch hole 840 that locks onto a notch (not shown) on an enclosure such as enclosure 104. The interaction of the notch and the latch hole 840 may prevent users from manually moving the front gate 808 via the delivery hatch 108 to access the interior of the enclosure 104. Accordingly, when the elevator module 804 links with the front gate 808, the elevator module 804 may have a mechanism or the linkage may otherwise cause the notch to be released from the latch hole 840 to allow the front gate 808 to move with the elevator module 804.

As will be appreciated, the elevator modules 804 and/or 304 may have other configurations. Further, other types of connectors (e.g., magnets, etc.) capable of physically linking the elevator module with the front gate are also contemplated. Returning again to FIG. 4, after the elevator module 304 links with the front gate 308 at block 412, the method 400 proceeds to block 416. At block 416, the elevator module 304 moves with the front gate 308 (i.e., while still linked with the front gate 308) to align the open portion 312 of the front gate 308 with the delivery hatch 108. The alignment of the open portion 312 with the delivery hatch 108 unblocks the delivery hatch 108 and allows access through the delivery hatch 108, and hence the front gate 308 may be said to be in an open position when the open portion 312 is aligned with the delivery hatch 108. Further, since the front gate 308 remains linked with the elevator module 304 access through the delivery hatch 108 is further restricted to the interior of the elevator module 304.

Figure 10:
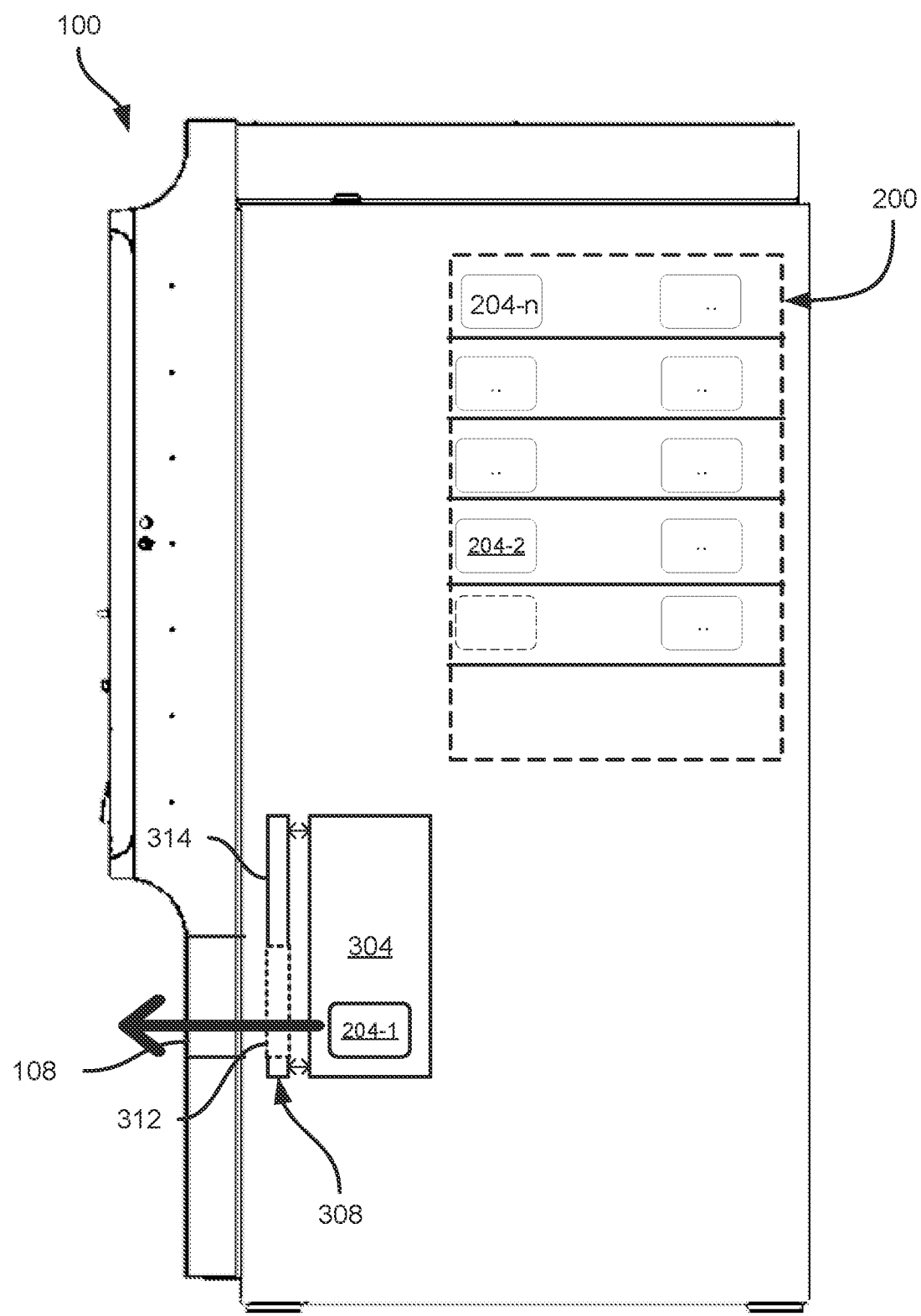
FIG. 10 shows an illustration of putting a front gate in an open position for delivery of an item.

For example, referring to FIG. 10, after linking with the front gate 308, the elevator module 304 moves to align the open portion 312 with the delivery hatch 108. Preferably, a bottom edge of the open portion 312 may be aligned with the bottom edge of the delivery hatch 108. Further, preferably, the bottom edges of the open portion 312 and the delivery hatch 108 may also be aligned with a floor of the interior of the elevator module 304. Thus, the item 204-1 in the elevator module 304 may be retrieved from the elevator module 304 by substantially pulling the item 204-1 out from the elevator module 304 with little to no elevational differences or barriers. Advantageously, this may facilitate accessibility, for example if the user lacks sufficient dexterity or strength to reach into the elevator module 304 and lift the item 204-1 off the floor of the elevator module 304 before removing it from the delivery hatch 108.

As will be appreciated, since the rear side of the elevator module 304 may be open to receive items 204 from the shelving unit 200 into the elevator module 304, when the elevator module 304 is connected to the front gate 308 and aligned in the open position, access to the remainder of the interior of the enclosure 104 may be gained through the elevator module 304. Accordingly, in some examples, the dispensing unit 300 may additionally include a rear gate 900, depicted in FIG. 9, for the elevator module 304 to link to. Thus, when the elevator module 304 links to the front gate 308 at block 412, the elevator module 304 may additionally link to the rear gate 900. Subsequently, when the elevator module 304 moves to align the open portion 312 of the front gate 308 with the delivery hatch 108, the elevator module 304 may additionally move the rear gate 900 (i.e., via the link between the elevator module 304 and the rear gate 900) to block the rear side of the elevator module 304 and restrict access through the elevator module 304 to the enclosure when the delivery hatch 108 is open. The elevator module 304 may employ similar connectors, such as the connection pins 820 to mate with corresponding brackets 824 on the rear gate 900.

Returning again to FIG. 4, after the front gate 308 is moved to the open position, with the open portion 312 aligned with the delivery hatch 108, the method 400 proceeds to block 420. At block 420, a determination is made as to whether the item 204-1 has been removed from the elevator module 304. For example, such a determination may be made by the elevator controller or another device controller. To determine whether the item 204-1 has been removed from the elevator module 304, the elevator module 304 may include one or more item detection sensors to enable detection of the presence or absence of an item 204 in the elevator module. For example, the item detection sensors may include one or more imaging sensors (e.g., optical/RGB cameras, infrared sensors, or the like), depth sensors, combinations of the above and other suitable sensors. The item detection sensors on elevator module 304 therefore enable detection of an item being removed from elevator module 304, in order to signal to elevator module 304 that front gate 308 should return to a closed position.

If the determination at block 420 is negative, that is, the item 204-1 has not yet been removed from the elevator module 304, then the method 400 proceeds to block 424. At block 424, the device 100 may wait for the item 204-1 to be removed and returns to block 420 to check if the item 204-1 has been removed. In particular, the front gate 308 remains in the open position with the open portion 312 aligned with the delivery hatch 108.

In some embodiments, elevator module 304 may be configured to allow front gate 308 to remain open for a set period of time, and if item 204 is not removed within the set period of time, front gate 308 will return to a closed position with item 204 remaining within elevator module 304. For example, the device 100 may initiate a delivery timer when the front gate 308 is moved to the open position and the item 204-1 in the elevator module 304 is accessible via the delivery hatch 108. If the delivery timer expires, the device 100 may identify an error condition and close the delivery hatch 108 (i.e., by moving the front gate 308 to the closed position with the closed portion 314 aligned with the delivery hatch 108). In addition to closing the delivery hatch 108, the device 100 may generate one or more alerts (e.g., an audio and/or visual alert, sending an email and/or text message to an operator or a registered user, or the like). In such instances, elevator module 304 may be configured to return item 204-1 to its original location in shelving unit 200. Elevator module 304 can include its own set of driving elements to aid in the returning of items 204 to shelving unit 200.

If the determination at block 420 is affirmative, that is, the item 204-1 has been removed from the elevator module 304, then the method 400 proceeds to block 428. At block 428, upon removal of item 204, front gate 308 is returned to a closed position. That is, the front gate 308 is moved such that the closed portion 314 is aligned with the delivery hatch.

Figure 11:
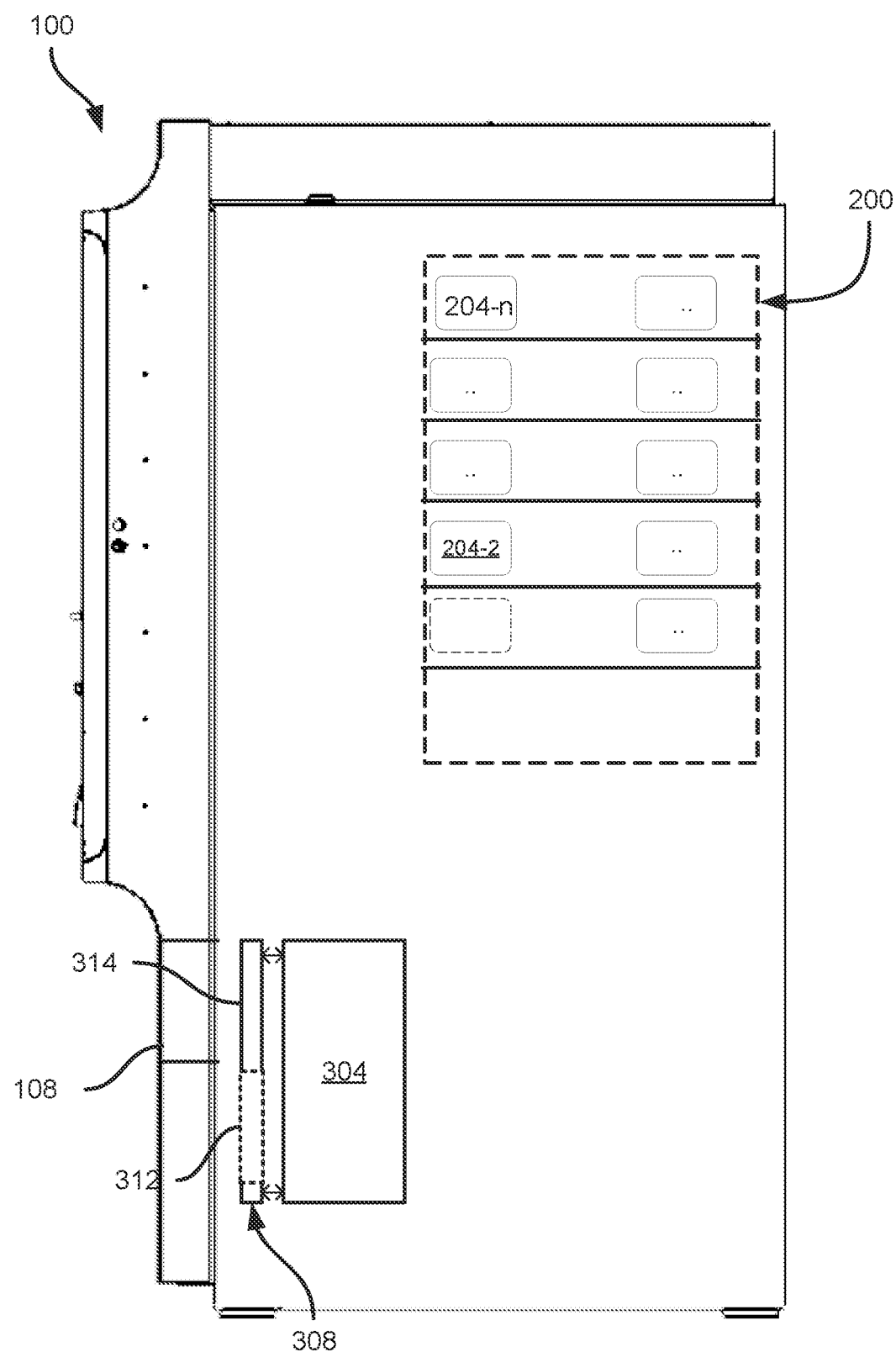
FIG. 11 and FIG. 12 show illustrations of a front gate returning to a closed position.

In reference to FIG. 11, to return front gate 308 to the closed position, elevator module 304 may move with the front gate 308 (i.e., while still linked together) to align closed portion 314 with delivery hatch 108, thus restricting access to elevator module 304.

Figure 12:
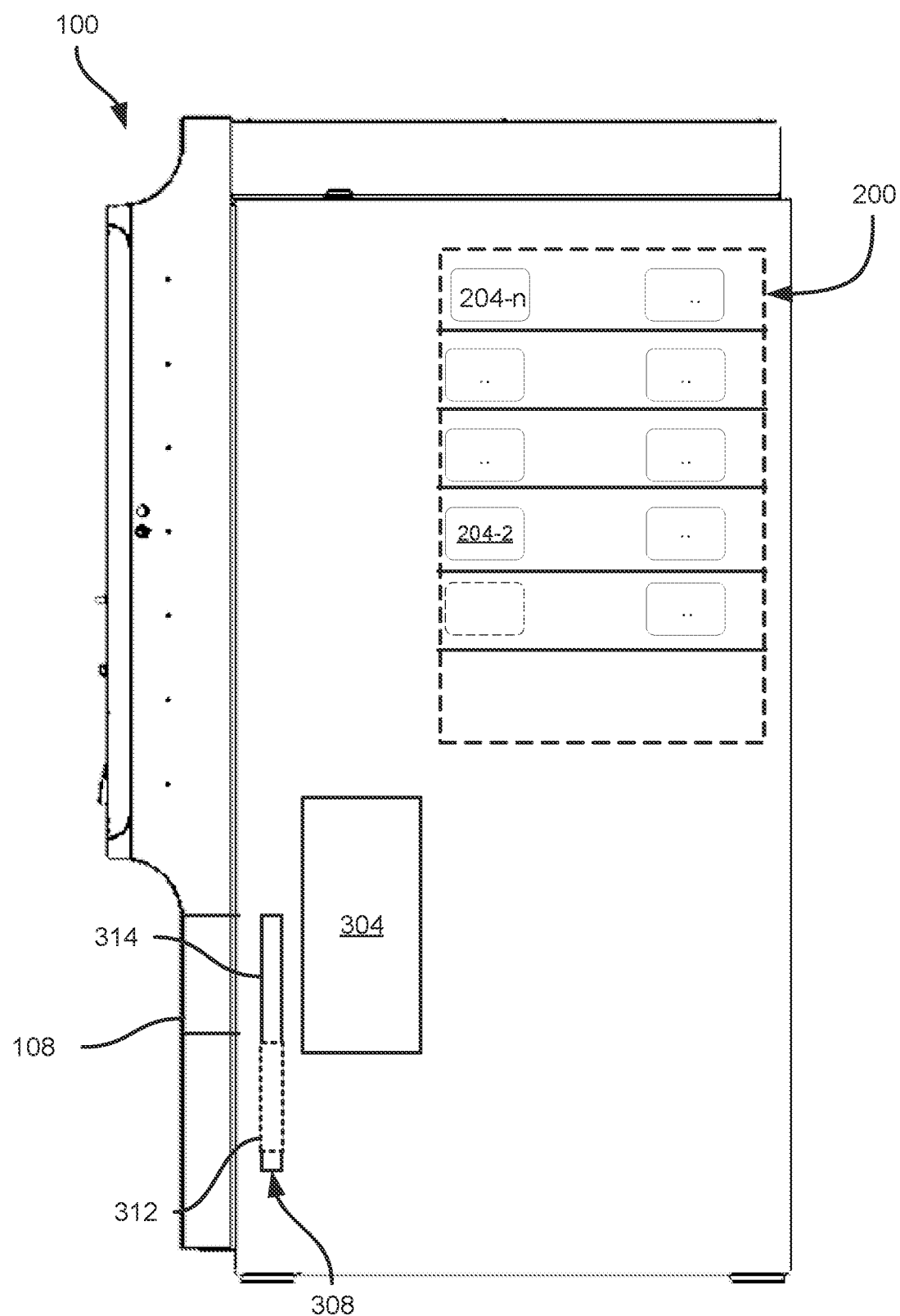

According to another example, an alternative method of putting front gate 308 back into a closed position can be seen in FIG. 12. In this example, elevator module 304 may remain substantially aligned with the delivery hatch 108, that is in the position it was in at block 416 and FIG. 10. While aligned with the delivery hatch 108, the elevator module 304 may unlink from front gate 308, allowing front gate 308 to return to the closed position with the closed portion 314 aligned with delivery hatch 108. In the present example, the closed position of the front gate 308 is lower than open position, and hence the front gate 308 is generally biased towards the closed position by gravity. In other examples, the front gate 308 may be biased towards the closed position by a mechanical biasing means, such as a spring or the like. When the front gate 308 returns to the closed position, it may be locked in the closed position, for example via the latch hole 840 interacting with a notch on the enclosure 104.

Figure 13:
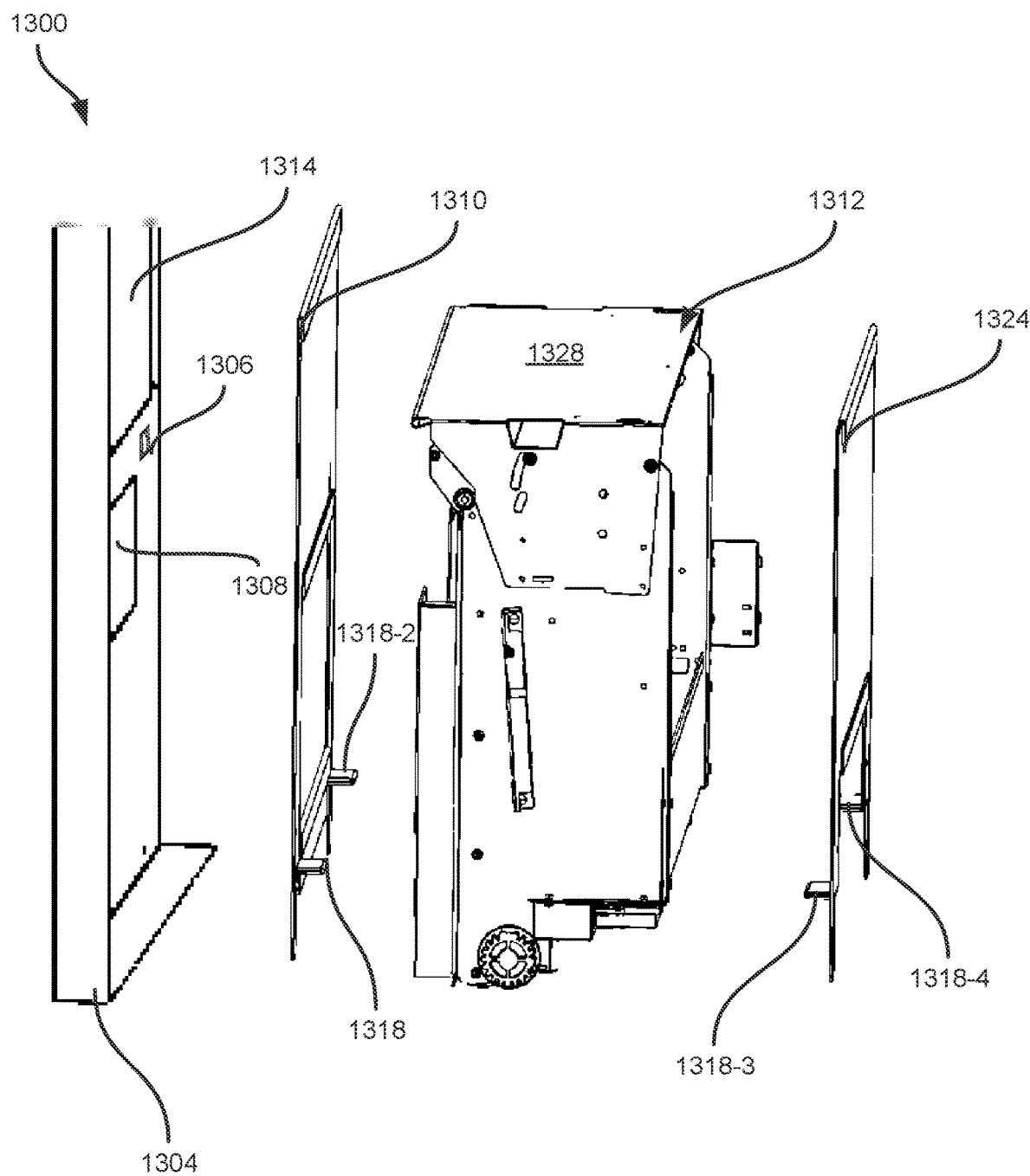
FIG. 13 shows an alternative embodiment of an asset management device.

A portion of an alternative embodiment of the asset management device may be seen in FIG. 13, referred to as asset management device 1300. In this embodiment, asset management device 1300 comprises an enclosure 1304, the enclosure 1304 comprising a notch 1306 and a delivery hatch 1308. Notch 1306 is used to lock onto a latch hole (not shown) on front gate 1310 to further increase the security of asset management device 1300 by allowing front gate 1310 to lock onto enclosure 1304. Enclosure 1304 can also comprise a graphical display 1314. Graphical display 1314 may include touch functionality. Graphical display 1314 can be configured to act as a user interface and can include a payment/identification (ID) device, a keypad, and a camera. The graphical display unit can include functionality that extends to devices for individuals with vision impairment and can include functionality that supports braille and/or haptic touches and audio feedback. In some embodiments, graphical display 1314 can be located on a lower portion of enclosure 1304, thereby delivering clear images to a user in a sitting position in, for example, a wheelchair. Displays using polarizers can be adjusted to preferred orientation to deliver better viewing angle without color changes or image inversions. Thus, the graphical display 1314 can be configured to meet WCAG guidelines, which include, for example, high contrast, simplified user interfaces for the visually impaired. Further, asset management device 1300 can offer non-contact assist for users if configured with a webcam integrated with a speaker and a microphone on enclosure Dispensing unit 1312 may include, in addition to front gate 1310 with brackets 1318, a rear gate 1324 with brackets 1318. Elevator module 1328 can link with rear gate 1324 through connection pins (not shown) on elevator module 1328, as previously discussed with regards to the linking of the front gate with the elevator module in the alternative embodiments above. Rear gate 1324 works to restrict entry into the shelving module (not shown) through elevator module 1328 when front gate 1310 is in an open position. Rear gate 1324, in alternative embodiments, may also comprise an open portion and a closed portion, and may align with delivery hatch 1308 in a similar manner to front gate 1310 to be placed in an open position or a closed position, as previously discussed. Front gate 1310 and rear gate 1324 can also be supported on guide rails (not shown) that facilitate the vertical movement of the gates within the asset management device 1300.

Elevator module 1328 may be enclosed by side plates, top plates, and bottom plates, and may include LED arrays, cameras, and a sensor suite around the various plates it is enclosed by. The LED arrays can include visible LEDs for illumination and UV LEDs for sanitization. The sensor suite can include sensors with various functionalities. A product sensor can detect whether an item is placed in the elevator module 1328. A hand sensor can detect user hands in/out the elevator module 1328 and detect whether an item is properly located in the elevator module 1328. A top end stop sensor can detect an upper location of the elevator module 1328. A bottom end sensor can detect a bottom location of the elevator module 1328.

Figure 14:
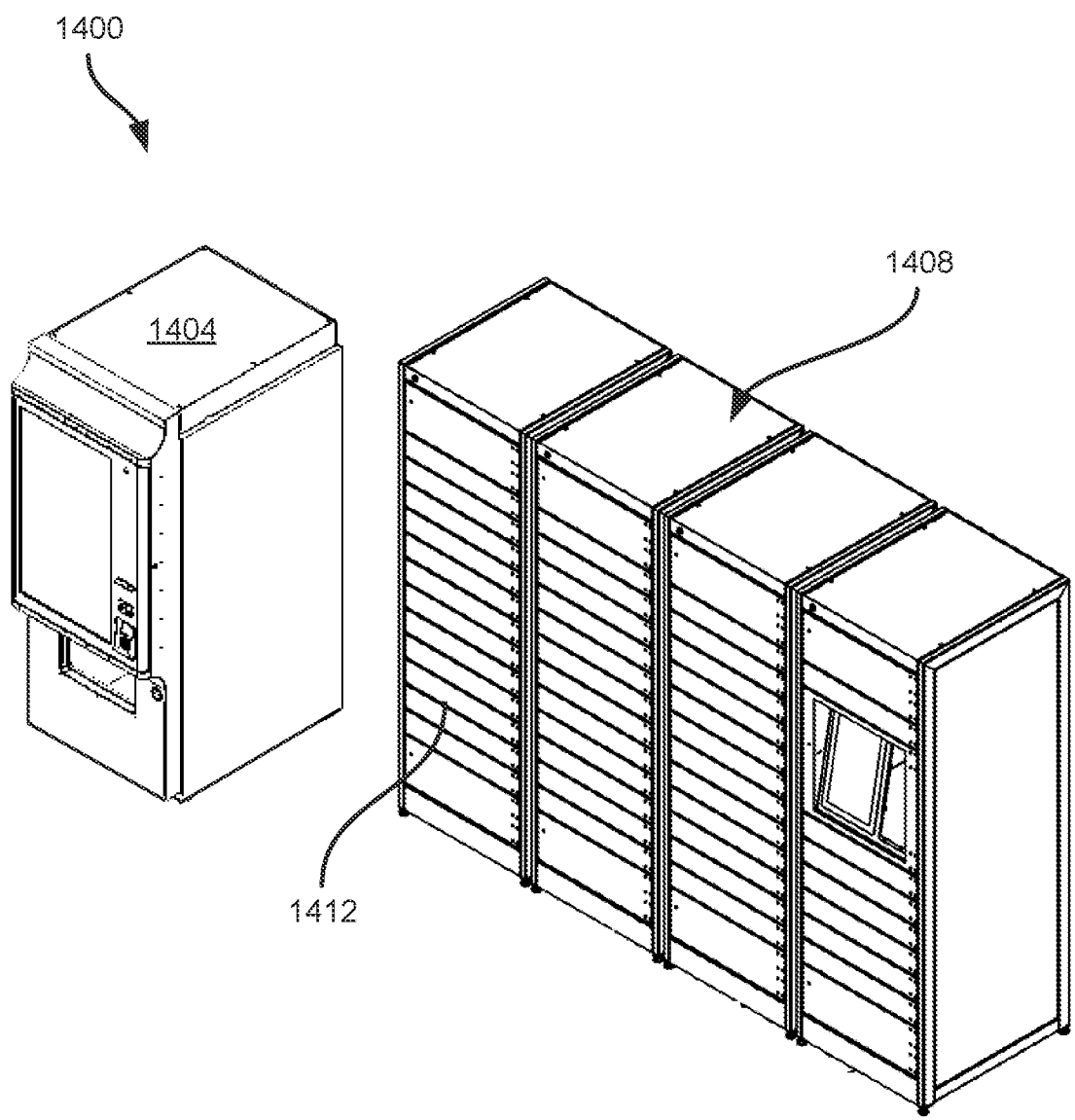
FIG. 14 shows a system wherein asset management device is linked with a locker unit.

Referring now to FIG. 14, an asset management system 1400 is shown. Asset management system 1400 comprises an asset management device 1404 that is paired with a locker unit 1408. When a user needs to stock an item or get a specific item such as a laptop, the user can use the automatic asset management system 1400 to accomplish this. The locker unit 1408 may include compartments 1412 to stock items. The items may be located either in lower compartments or higher compartments depending on users' conditions. For example, a user sitting in wheelchair may require use of lower compartments.

Asset management system 1400 may also be configured to be used in a mode which employs features that allow users with certain accessibility requirements to use the asset management system 1400. This mode may be known as accessibility mode. This mode may be selected from a button on the display of asset management device 1404. The location of the accessibility mode button may be positioned towards the bottom of the display device, to allow users who for example, are seated in a wheelchair to be able to reach the accessibility mode button. When the user selects the accessibility mode button, the display of automatic asset management device 1404 is adjusted, enabling the user to easily access the display. In some embodiments, when using accessibility mode, the control system can send a command to open the lower compartments of locker unit 1408 for a user who would not be able to reach the higher compartments.

The invention claimed is:

1. An automatic asset management device comprising:
   an enclosure;
   a shelving unit within the enclosure, the shelving unit configured to store a plurality of items;
   a delivery hatch on the enclosure, the delivery hatch configured to allow access to the enclosure;
   a dispensing unit within the enclosure, the dispensing unit comprising:
   a front gate having an open portion and a closed portion, wherein the front gate is configured to control access through the delivery hatch; and
   an elevator module configured to:
      receive an item of the plurality of items from the shelving unit;
      move to the front gate to link with the front gate; and
      while linked with the front gate, move with the front gate to align the open portion with the delivery hatch to allow access to the item within the elevator module; and
   wherein, upon removal of the item from the elevator module, the dispensing unit is configured to cause the front gate to align the closed portion with the delivery hatch to restrict access to the delivery hatch.

2. The automatic asset management device of claim 1, further comprising:
   a bracket on the front gate; and
   a connection pin on the elevator module, wherein the connection pin is configured to link to the bracket to allow the elevator module and front gate to link together.

3. The automatic asset management device of claim 1, wherein the shelving unit further comprises:
   at least one shelving rack; and
   at least one driving element configured to move the item from the shelving rack into the elevator module.

4. The automatic asset management device of claim 1, wherein the dispensing unit further comprises a rear gate configured to restrict access to the shelving unit through the dispensing unit.

5. The automatic asset management device of claim 4, further comprising:
   a connection pin on a rear side of the elevator module; and
   a bracket on the rear gate;
   wherein the connection pin is configured to link to the bracket to allow the elevator module and rear gate to link together.

6. The automatic asset management device of claim 1, further comprising a linear actuator on the elevator module, the linear actuator configured to link the elevator module to the front gate and to enable movement of the elevator module together with the front gate.

7. The automatic asset management device of claim 1, further comprising a user interface to enable users to make selections and payments.

8. The automatic asset management device of claim 1, wherein the elevator module further comprises a sensor suite, the sensor suite configured to:
   detect a location of the elevator module within the enclosure, allowing the elevator module to link automatically with the front gate once it has been reached;
   detect once a product has been moved into the elevator module, allowing the elevator module to move the front gate to an open position; and
   detect once a product has been taken out of the elevator module through the delivery hatch, allowing the elevator module to return to a resting position.

9. The automatic asset management device of claim 1, wherein the elevator module further comprises an elevator controller configured to control movement of the elevator module to the front gate.

10. The automatic asset management device of claim 1, wherein the elevator module is configured to unlink from the front gate, allowing the closed portion of the front gate to align with the delivery hatch to restrict access to the delivery hatch.

11. The automatic asset management device of claim 1, wherein a floor of the elevator module aligns with a bottom edge of the delivery hatch when the open portion of the front gate is aligned with the delivery hatch.

12. A method for dispensing an item from an automatic asset management device, the method comprising:
    receiving an item from a shelving unit into at an elevator module;
    controlling the elevator module to move to a front gate;
    upon the elevator module reaching the front gate, linking the elevator module with the front gate;
    moving the elevator module together with the front gate to align an open portion on the front gate with a delivery hatch, allowing access to the item in the elevator module; and
    upon removal of the item from the delivery hatch, aligning a closed portion on the front gate with the delivery hatch, preventing further access to the automatic asset management device.

13. The method of claim 12, wherein linking the elevator module with the front gate comprises: extending a connection pin from the elevator module to mate with a bracket on the front gate.

14. The method of claim 12, wherein receiving an item from a shelving unit into at an elevator module comprises: driving, via a driving element of the shelving unit, the item from the shelving unit into the elevator module.

15. The method of claim 12, further comprising: prior to moving the elevator module to align the open portion with the delivery hatch, linking the elevator module with a rear gate.

16. The method of claim 12, further comprising one or more of:
    detecting a location of the elevator module within an enclosure, allowing the elevator module to link automatically with the front gate once it has been reached;
    detecting once a product has been moved into the elevator module, allowing the elevator module to move the front gate to an open position; and
    detecting once a product has been taken out of the elevator module through the delivery hatch, allowing the elevator module to return to a resting position.

17. The method of claim 12, wherein aligning the closed portion of the front gate with the delivery hatch comprises:
    releasing the front gate from the elevator module; and
    biasing the front gate to align the closed portion with the delivery hatch.

18. The method of claim 12, wherein aligning the closed portion of the front gate with the delivery hatch comprises:
    moving the elevator module, while linked to the front gate, to align the closed portion of the front gate with the delivery hatch.

19. The method of claim 12, wherein aligning the open portion with the delivery hatch further comprises:
    aligning a floor of the elevator module with a bottom edge of the delivery hatch.

* * * * *